United States Patent

Yasui et al.

[11] 4,213,660
[45] Jul. 22, 1980

[54] BEARING ASSEMBLY CONSTRUCTION

[75] Inventors: Yasuyosi Yasui, Toyota; Mitugu Izuta, Okazaki; Sigeki Okaguchi, Toyota, all of Japan

[73] Assignee: Toyota Jidosha Kogyo Kabushiki Kaisha, Aichi, Japan

[21] Appl. No.: 11,649

[22] Filed: Feb. 12, 1979

[30] Foreign Application Priority Data

Feb. 15, 1978 [JP] Japan .................. 53-16267

[51] Int. Cl.² ............................................. F16C 19/24
[52] U.S. Cl. ............................. 308/177; 308/207 R; 308/216; 308/237 R; 308/DIG. 11; 29/525; 29/DIG. 23
[58] Field of Search ............... 308/177, 207 R, 216, 308/237 R, DIG. 11, 189 R; 29/525, 432, DIG. 23

[56] References Cited

U.S. PATENT DOCUMENTS

| | | | |
|---|---|---|---|
| 1,614,603 | 1/1927 | Dewire | 29/DIG. 23 |
| 4,085,984 | 4/1978 | Cameron | 308/216 |
| 4,150,476 | 4/1979 | Kita | 29/525 |

FOREIGN PATENT DOCUMENTS 1019883  1/1953  France ................. 29/DIG. 23

*Primary Examiner*—Lenard A. Footland
*Attorney, Agent, or Firm*—Armstrong, Nikaido, Marmelstein & Kubovcik

[57] ABSTRACT

In an axle box structure of soft metal such as aluminum alloy including a bearing bore, a sleeve member of hard metal such as iron pressedly engaged within the bearing bore, and a rolling bearing assembled within the sleeve member to support an axle shaft thereon, the sleeve member has on its outer periphery an axial knurl or serration to be embedded in the axle box structure, the knurl or serration being annularly formed with a predetermined axial length substantially at the central portion of the sleeve member such that the crest diameter of the knurl or serration is larger than the outer diameter of the sleeve member and that the root diameter of the knurl or serration is smaller than the outer diameter of the sleeve member.

3 Claims, 5 Drawing Figures

BEARING ASSEMBLY CONSTRUCTION

BACKGROUND OF THE INVENTION

The present invention relates to a bearing assembly construction, and more particularly to a bearing assembly construction suitable for assembling a rolling bearing of hard metal within an axle box structure of soft metal such as aluminum alloy.

In case a rolling bearing of steel metal directly assembled within an axle box structure of aluminum alloy is used in a high temperature atmosphere, an undesirable clearance occurs between the axle box structure and the rolling bearing due to a difference between respective coefficients of thermal expansion of the two metals. The clearance causes relative rotation of the outer race of the bearing against the axle box structure, causing defacement of the structure. To avoid the above-noted defects, it has been proposed that a sleeve member of hard metal be secured by a press fit or shrink fit in position within the axle box structure to fixedly assemble the rolling bearing. In such a conventional bearing construction, it is required that the press fit or shrink fit of the sleeve member be made in consideration with such various conditions as temperature in use, strength of the axle box structure, rotational speed of the axle and the like to ensure the accuracy of the bearing assembly without undesirable displacement of the sleeve member in replacement of the bearing. This results in various difficulties in actual practices of the bearing assembly construction.

SUMMARY OF THE INVENTION

It is, therefore, a primary object of the present invention to provide an improved bearing assembly construction in which a sleeve member of hard metal is press fitted within a bearing bore of an axle box structure of soft metal to be secured in position without undesirable relative rotation and displacement against the axle box structure.

According to the present invention, in an axle box structure of soft metal such as aluminum alloy including a bearing bore, a sleeve member of hard metal such as iron is press fitted within the bearing bore, and a rolling bearing is assembled within the sleeve member to support an axle shaft thereon. The sleeve member has on its outer periphery an axial knurl or serration to be embedded in the axle box structure, the knurl or serration being annularly formed with a predetermined axial length substantially at the central portion of the sleeve member such that the crest diameter of the knurl or serration is larger than the outer diameter of the sleeve member and the root diameter of the knurl or serration is smaller than the outer diameter of sleeve member.

BRIEF DESCRIPTION OF THE DRAWINGS

Additional objects and advantages of the present invention will be more readily apparent from the following detailed description of a preferred embodiment thereof when taken together with the accompanying drawings in which.

DESCRIPTION OF THE PREFERRED EMBODIMENT

Referring now to the accompanying drawings, illustrated is a preferred embodiment of the present invention which is adapted to a bearing assembly construction for a drive pinion shaft 10 of a final drive gearing of a power transmission unit. In the bearing assembly construction, the drive pinion shaft 10 is rotatably supported by a pair of tapered roller bearings 11, 12 carried on a trans-axle casing 15 through a pair of sleeve members 13, 14. The tapered roller bearings 11, 12 are made of steel metal, the sleeve members 13, 14 are made of iron, and the trans-axle casing 15 is made of aluminum alloy.

Figure 1:
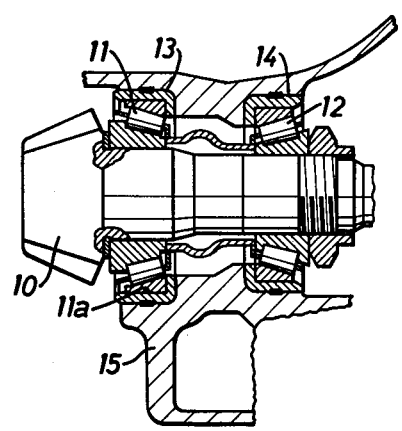
FIG. 1 is a sectional elevation of the present bearing assembly construction adapted to a drive pinion shaft of a final drive gearing of a power transmission unit.
Figure 2:
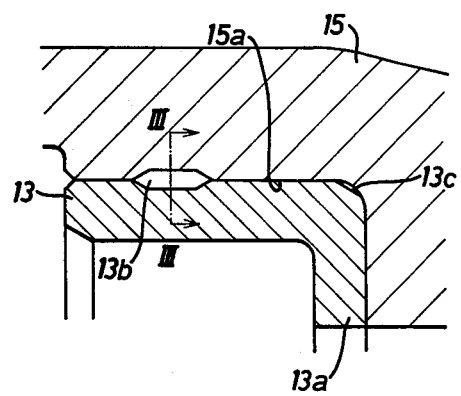
FIG. 2 is an enlarged sectional view showing the knurled portion of a sleeve member of FIG. 1.
Figure 3:
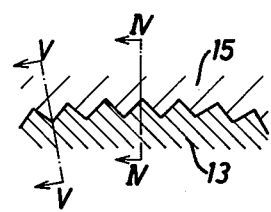
FIG. 3 is a sectional view taken along line III—III of FIG. 2.
Figure 4:
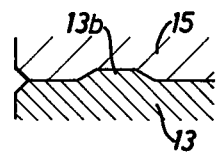
FIG. 4 is a sectional view taken along line IV—IV of FIG. 3.
Figure 5:
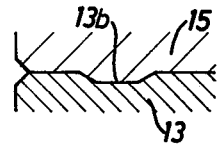
FIG. 5 is a sectional view taken along line V—V of FIG. 3.

The sleeve member 13 is different from the sleeve member 14 only at its outer diameter and has substantially the same construction as that of the sleeve member 14. As is seen clearly in FIG. 2, the sleeve member 13 is provided at its right end with an annular flange 13a and at its outer periphery with knurls or serrations 13b. The knurl 13b is annularly formed with a predetermined axial length by a thread rolling machine in such a manner that the crest diameter of the knurl is larger than the outer diameter of sleeve member 13 and the root diameter of the knurl is smaller than the outer diameter of sleeve member 13. In addition, the outer periphery of sleeve member 13 has at its right end an annular tapered surface 13c, and the knurl 13b is formed substantially at the central portion of sleeve member 13.

In assembling of the sleeve member 13 within an axial bearing bore 15a of the trans-axle casing structure 15, the sleeve member 13 is inserted into the bearing bore 15a from its annular flange 13a and is guided by engagement of its tapered surface 13c with the opening edge of bearing bore 15a. Then, the right side cylindrical portion of sleeve member 13 is engaged within the bearing bore 15a with a slight interference, and the axis of sleeve member 13 coincides with the axis of bearing bore 15. When the knurled portion of sleeve member 13 is subsequently inserted into the bearing bore 15a under continuous pressure, the inner wall structure of bore 15a is pressed by each crest of knurl 13b and extruded into each root of knurl 13b thus becoming fitted with the contour of knurl. After insertion of the knurled portion 13b, the extruded portions of the inner wall structure are repressed by the left side cylindrical portion of sleeve member 13 and is reformed in its original shape so that the knurled portion 13b is embedded in the inner wall structure of bearing bore 15a. Thus, the tapered roller bearing 11 is fixedly engaged within the sleeve member 13 to support the drive pinion shaft 10 thereon.

With the bearing assembly construction described above, the sleeve member 13 is retained in position without undesirable relative rotation with respect to the casing structure 15 even if the power transmission unit is driven at a high speed in a high temperature atmosphere or the bore of sleeve member 13 is finished by a boring machine. Furthermore, when the used bearing 11 is replaced with a new one, the sleeve member 13 is retained in position due to the embedded portion of knurl 13b to ensure the accuracy of the bearing assembly. In actual practices of the present invention, the knurl 13b of sleeve member 13 may be replaced with serrations formed by a thread rolling machine.

Having now fully set forth both structure and operation of a preferred embodiment of the concept underlying the present invention, various other embodiments as well as certain variations and modifications of the embodiment herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. In an axle box structure of soft metal including a bearing bore, a sleeve member of hard metal engaged within said bearing bore, and a rolling bearing assembled within said sleeve member to support an axle shaft thereon, the improvement wherein said sleeve member has on a portion of its outer periphery an axial knurl or serration means for embedding in said axle box structure, said knurl or serration means being annularly formed in a predetermined axial length substantially at the central portion of said sleeve member wherein the crest diameter of said knurl or serration means is larger than the outer diameter of said sleeve member and the root diameter of said knurl or serration means is smaller than the outer diameter of said sleeve member.

2. The improvement as claimed in claim 1, wherein said sleeve member includes on its inner end an annular flange means for assembling said rolling bearing in position.

3. The improvement as claimed in claim 2, wherein said sleeve member includes on the inner end of its outer periphery an annular tapered surface.

* * * * *